United States Patent

[11] 3,564,316

| [72] | Inventors | Marion J. Witzenburg<br>Peoria;<br>Kenton C. Opperman, Morton, Ill. |
|---|---|---|
| [21] | Appl. No. | 814,664 |
| [22] | Filed | Apr. 9, 1969 |
| [45] | Patented | Feb. 16, 1971 |
| [73] | Assignee | Caterpillar Tractor Co.<br>Peoria, Ill. |

[54] COMPOSITE COMMUTATOR BAR
1 Claim, 3 Drawing Figs.

| [52] | U.S. Cl. | 310/236 |
|---|---|---|
| [51] | Int. Cl. | H02k 13/04 |
| [50] | Field of Search | 310/231, 233, 235, 234, 236, 271 |

[56] References Cited
UNITED STATES PATENTS

| 537,480 | 4/1895 | Painter | 310/236 |
|---|---|---|---|
| 2,837,671 | 6/1958 | Reardon et al. | 310/236 |

Primary Examiner—D. F. Duggan
Assistant Examiner—L. L. Smith
Attorney—Fryer, Tjensvold, Feix, Phillips & Lempio ABSTRACT: A commutator bar compositely formed to have a conductive section including a riser and a brush contact forming indentations which permit clamping rings to secure the bar upon assembly.

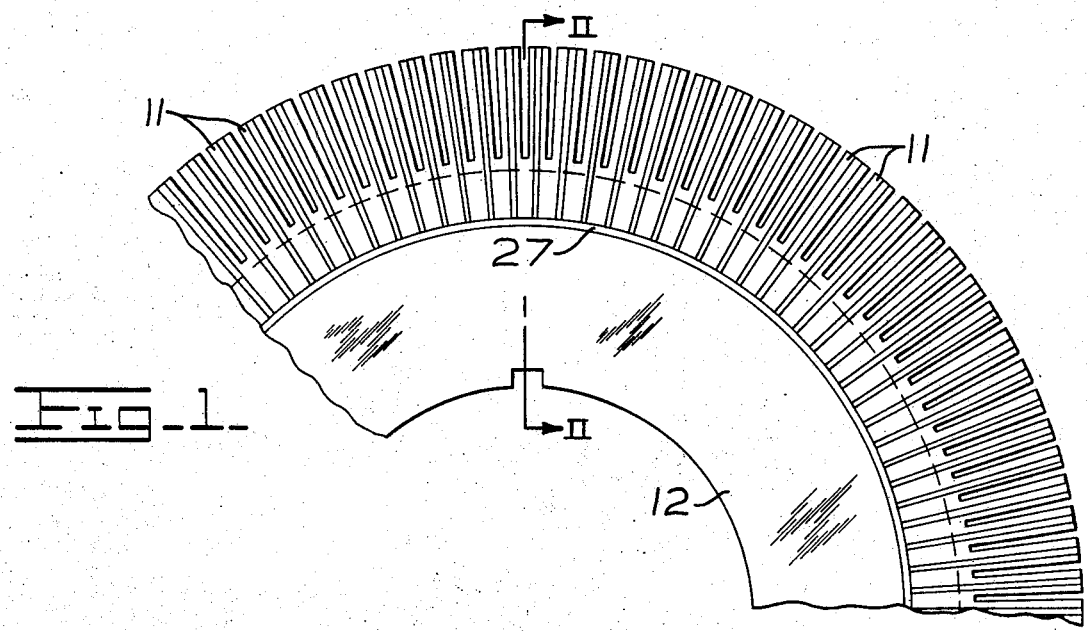
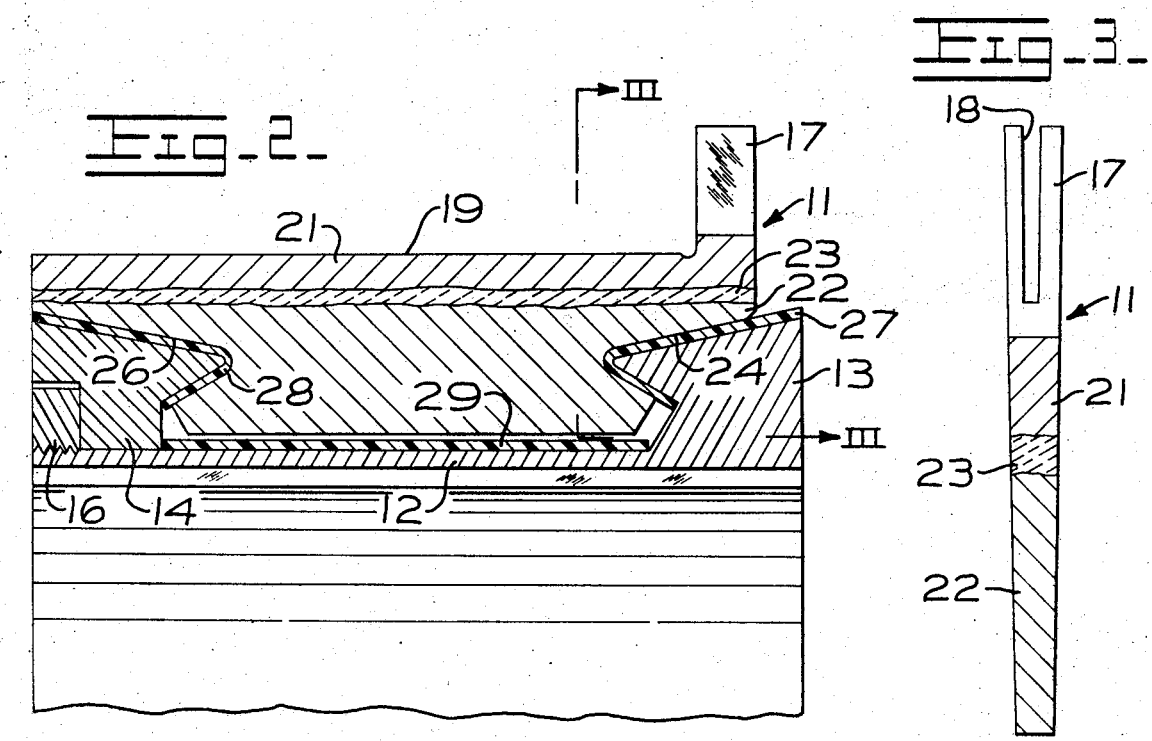
INVENTORS
MARION J. WITZENBURG
KENTON C. OPPERMAN
BY
ATTORNEYS 3,564,316

COMPOSITE COMMUTATOR BAR

Commutator assemblies are conventionally formed with a plurality of conductive bars being insulated from each other and being secured in radial relation about a commutator-mounting shell or hub. The radially outward portions of the bars commonly include risers for electrically wiring the commutator assembly and flat axially aligned surfaces which together form a cylindrical brush contact surface. Normally, the commutator bars are constructed entirely of a highly conductive metal such as copper or copper alloy.

In operation, it is essential to maintain proper alignment of the commutator bars in order to permit proper engagement of electrical brushes with the brush contact surfaces of the bars. Maintaining alignment of the commutator bars is a particular problem in commutator assemblies which are to be employed for high speed operation. Centrifugal forces acting upon the commutator bars tend to cause radial misalignment which interferes with brush engagement. A common method of avoiding such misalignment in the prior art includes the use of nonconductive retaining bands which are disposed in slots at the outer periphery of the commutator bars and which encircle the commutator bars within a commutator assembly.

This method of restraining the commutator bars is initially undesirable because of the additional steps necessary to construct a commutator assembly. Still further, some prior art employs bands formed of conductive material and insulated from the commutator. Particularly within arrangements of this type, a substantial mass is located radially outwardly from the axis of rotation for the commutator assembly. Thus, the retaining bands may be seen as adding substantial mass which does not assist in electrical operation of the commutator assembly and which is particularly subject to centrifugal and inertia forces during rotation of the assembly.

The present invention minimizes the above problems and provides a commutator bar having a novel construction permitting it to be positively secured to a commutator hub or other mounting shell and maintained in accurate alignment even during high speed operation. In particular, the present commutator bar includes an electrically conductive section and a high strength section which includes means for securing the commutator bar to the hub.

Accordingly, it is an object of the present invention to provide a commutator bar which may be positively positioned upon a hub during high speed rotation.

Other objects include construction of the high strength section from metals which are relatively less dense and more rigid than the electrically conductive section in order to respectively reduce the rotating mass of the commutator assembly and to more positively align the electrically conductive sections of the commutator bars within a commutator assembly.

As will be made apparent from a preferred embodiment of the invention as described below, it is contemplated that the present commutator bar may be secured to a hub without the need for conventional restraining bands about the outer periphery of the assembled bars. It will also be apparent that the use of higher strength and lower density portions of the bars and the absence of conventional restraining bands permit a substantial reduction in size and weight of the commutator assembly. Thus, it is believed that the present invention provides substantial operating advantages particularly within a commutator assembly designed for operation at high speeds of rotation.

Other objects and advantages of the invention are made apparent in the following description having reference to the drawing.

In the drawing:

FIG. 1 is an axial end view of an arcuate section of a commutator assembly;

FIG. 2 is a view taken along section lines II–II of FIG. 1 to particularly illustrate the construction of a single commutator bar and the manner in which it is secured to a hub of the commutator assembly; and FIG. 3 is a view of the commutator bar taken along section line III–III of FIG. 2.

Referring now to the drawing, the commutator assembly partially shown in FIG. 1 includes a plurality of arcuately spaced commutator bars 11 disposed in radial arrangement about a hub or mounting shell 12. The commutator bars 11 are conventionally maintained in electrically insulated relation with each other. Referring also to FIg. 2, the commutator bars 11 are secured upon the hub 12 by a pair of clamping rings, one of which is shown at 13 as being integrally formed with the hub 12. The other clamping ring 14 is slidably arranged on the hub 12 and is secured in place by a commutator nut 16 which threadedly engages the hub 12.

Each of the commutator bars 11, as best seen in FIGS. 2 and 3, include a riser 17 which is slotted as indicated at 18 in FIG. 3 to permit electrical wiring of the commutator assembly. Each of the commutator bars 11 also has a generally flat end surface 19 formed along its radially outer periphery. When the commutator bars are radially mounted upon the hub 12 as shown in FIG. 1, the flat surfaces 19 form a generally circumferential contact surface which is engaged by electrical brushes (not shown). As noted above, it is particularly important to maintain proper alignment of the surfaces 19 so that they may be suitably contacted by the brushes for efficient electrical operation.

To insure proper electrical current carrying capabilities at the contact surfaces 19 and within the risers 17, a section of the commutator bar 11 which includes those elements is indicated at 21 and is formed of a highly conductive metal such as copper or copper alloys.

As contemplated by the present invention, the commutator bars 11 are compositely formed to have another section 22 formed from a material such as steel to have relatively high strength characteristics as compared to the conductive section 21. The high strength section 22 forms the base or radially inward portion of the commutator bar 11 so that it is generally adjacent the hub 12. The two commutator bar sections 21 and 22 are preferably bonded together into an integral structure, for example, by electron beam welding or furnace braising at their juncture generally indicated at 23. The mass of the conductive section 21 is selected to substantially provide for current carrying capabilities within the commutator bar 11. However, with that section being constructed of a conductive metal such as copper, it tends to be relatively dense. It also tends to be somewhat flexible and ductile which interferes with stability of the commutator bars particularly during high speed operation of the commutator assembly. Accordingly, the high strength section 22 is constructed from a material which is less dense than the conductive section 21 and which tends to be relatively rigid. Thus, the high strength section 22 not only reduces the weight of the commutator assembly but additionally serves to more positively secure the conductive section 21 and to provide for more accurate alignment of the contact surfaces 19.

To secure the commutator bars 11 upon the hub 12, indentations 24 and 26 are formed on opposite ends of the high strength section 22 for engagement by the clamping rings 13 and 14 respectively. The high strength sections 22 of the commutator bars 11 are maintained in electrical isolation from the hub 12 by insulating pads indicated respectively at 27, 28 and 29.

We claim:

1. A commutator assembly suitable for high speed operation comprising a hub, a plurality of commutator bars radially arranged about the hub, the bars being indented adjacent the hub with clamping rings being mounted on the hub and engaging the indentations in the bars to firmly secure them upon the hub and means to electrically insulate the bars from each other and the hub, each commutator bar being compositely formed of a rigid, high strength steel section adjacent the hub and defining the indentations and a conductive section consisting of a member selected from the group consisting of copper and copper alloys, the conductive section being integrally bonded to the rigid, high strength section along the entire length of each commutator bar and forming a radially outer portion of the commutator bar remote from the hub, the conductive sections of the plurality of bars including circumferentially aligned slotted risers for electrical wiring of the commutator assembly and continuous flat end surfaces formed respectively along the radially outer peripheries of the conductive sections to provide a cylindrical brush contact surface, the mass of the conductive section of each commutator bar being selected to insure sufficient electrical current carrying capacity within each commutator bar at the contact surface and within the riser commonly provided by the conductive section.